(12) United States Patent
Oliveira et al.

(10) Patent No.: US 8,649,994 B2
(45) Date of Patent: *Feb. 11, 2014

(54) AUTOMATED AND COORDINATED SIMULATION OF MULTIPLE CONCURRENT USER INTERACTIONS

(75) Inventors: Edouard Oliveira, Corona, CA (US); David H. Close, Irvine, CA (US); Jason Kyong-min Yi, Irvine, CA (US); Raghunath Narasimha Murthy Gunti, Irvine, CA (US); David Franciosi, Laguna Niguel, CA (US)

(73) Assignee: Thales Avionics, Inc., Irvine, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 13/151,535

(22) Filed: Jun. 2, 2011

(65) Prior Publication Data

US 2012/0310584 A1    Dec. 6, 2012

(51) Int. Cl.
*G06F 19/00* (2011.01)

(52) U.S. Cl.
USPC ......................................................... 702/119

(58) Field of Classification Search
USPC ......................................................... 702/119
See application file for complete search history.

(56) References Cited

U.S. PATENT DOCUMENTS

| | | |
|---|---|---|
| 6,453,259 B1 | 9/2002 | Infiesto |
| 6,499,027 B1 | 12/2002 | Weinberger |
| 6,609,051 B2 | 8/2003 | Fiechter et al. |
| 6,728,612 B1 | 4/2004 | Carver et al. |
| 6,938,258 B1 | 8/2005 | Weinberger et al. |
| 7,171,345 B2 | 1/2007 | Mocek |
| 7,269,761 B2 | 9/2007 | Yi |

OTHER PUBLICATIONS

André Baresel, Using TTCN-3 in an Automotive Context, Apr. 5, 2004 RIC/SM, Research on Software Technology Methods and Tools, p. 1-12, DaimlerChrysler.*
G. Bhaskar Rao, Network Element Testing Using TTCN-3:Benefits and Comparison, A. Prinz, R. Reed, and J. Reed (Eds.): SDL 2005, LNCS 3530, pp. 265-280, 2005. Springer-Verlag Berlin Heidelberg 2005.*
International Search Report and Written Opinion of the International Searching Authority, Application No. PCT/US 12/40213, Aug. 1, 2012.
International Search Report and Written Opinion of the International Searching Authority, Application No. PCT/US 12/39565, Aug. 10, 2012.
Notification of Transmittal of International Preliminary Report on Patentability, Application No. PCT/US12/40213, Date of Mailing: Jun. 3, 2013; 7 pages.

* cited by examiner

*Primary Examiner* — Tung S Lau
(74) *Attorney, Agent, or Firm* — Myers Bigel Sibley & Sajovec, P.A.

(57) ABSTRACT

A method and associated system are provided for testing components of a vehicle entertainment system, comprising: interconnecting, via a network, a server computer comprising media content, and a plurality of user computers comprising software and hardware via which the user can interact with the media content; loading a test agent component onto a first of the user computers; loading a first scenario file comprising a series of user entry events that emulate user entry actions via a user interface device of the first user computer; executing the user entry events of the first scenario file by the test agent to generate system events that would normally be generated by a user operating the first user computer to interact with media server; and responding to the first user computer, by the server computer, to the system events.

19 Claims, 4 Drawing Sheets

AUTOMATED AND COORDINATED SIMULATION OF MULTIPLE CONCURRENT USER INTERACTIONS

BACKGROUND

The invention relates to a system and method for testing a distributed, multi-user computer system, and more specifically, relates to the control and testing of such a computer system that is an in-flight entertainment system for commercial aircraft.

Passengers in a commercial aircraft may be provided with personalized entertainment through an in-flight entertainment system (IFES). Such a system typically comprises multiple computer systems connected together with a communication network. Some of the computer systems are dedicated to serving individual passengers (passenger computer), some provide services to all passengers and crew members (server computers), and some (network computers) provide coordination and/or communication functions to allow all the systems to work together. Many of these devices/computers/components are implemented as what are called line-replaceable units (LRUs), i.e. units that are modular in nature, having a similar shape, size, connection, etc. so that they may be rapidly added and removed from the aircraft to minimize downtime. Software to provide the entertainment service is typically distributed among the multiple computers which comprise the IFES.

Overall control of an IFES is performed by members of the aircraft crew, again using computer systems dedicated to that function. These crew computer systems are logically similar to the systems dedicated to each passenger. Both individual passenger computer systems and crew control computer systems have user interface software to accept requests and provide responses. While the possible requests and responses are different for the two types of system users (crew and passengers), the general concept of use is the same.

Testing IFES software can be difficult because of the need to coordinate activities performed using each of the multiple computer systems in the IFES. Previously, most testing was performed manually, by asking a group of individuals to act as the passengers and crew would under various circumstances. The number of individuals in the group might range from one to several dozen, but would almost never reach the number of passengers and crew who might actually be on-board an aircraft using the IFES. Thus, testing did not reliably represent the actual conditions under which the IFES product would be used, particularly with respect to loading and variety of simultaneous operations.

In some cases, testing might be accomplished using a mechanical device to physically press buttons or physically perform other actions that a passenger or crew member might use to control his or her personal experience with the IFES. However, using a mechanical device to simulate all of the passengers and crew members on an aircraft would be very expensive because of the size of the device required. Further, such a device would be unlikely to work properly with different versions of the IFES, requiring multiple expensive devices to test all of the IFES products available to customers. And because of the complexity of such a device, it would likely be difficult to separate issues related to the device from issues related to the IFES under test. Use of a mechanical device is thus not an implemented technique in the IFE industry.

Manual testing is extremely difficult to coordinate, and the collection of results is haphazard at best. It is nearly impossible to get a group of individuals to perform actions in a synchronized manner except with extensive practice. Even then, the repertoire of practiced actions would be much smaller than the set of possible actions to be tested. Assembling a large group of testing individuals is a significant expense and the members of the group are unlikely to be the same for multiple tests. The result is that such tests cannot be reproduced reliably, and therefore it is generally impossible to verify that a previously identified problem has been fixed.

Although it may be possible to add mechanical or electronic test connections to the computer systems which comprise an IFES, and also possible to conduct manual testing using non-professional individuals to save some cost, these testing techniques are prohibitively expensive in both labor and materials.

Adding standard mechanical or electronic test connections to computer systems increases their cost, reducing the ability of such systems to compete successfully in the market. Such connections would also increase the complexity of such systems, increasing the number of possible failure points, and reducing the reliability. They might also increase the weight or necessary power, compounding competitive strain.

Because full system testing requires the physical presence of all the computer systems which comprise an IFES, and because such systems are expensive and in short supply, it is not practical to conduct such tests using ad-hoc groups of individuals at physically diverse locations. Individuals performing the tests must have substantial familiarity with the IFES to avoid wasted time and may require a degree of (non-governmental) security clearance to be permitted access to the test environment.

SUMMARY

In order to reduce time and cost associated with testing an IFES, and to provide greater repeatability, a method is provided for testing components of a vehicle entertainment system, comprising: interconnecting, via a network, a server computer comprising media content, and a plurality of user computers comprising software and hardware via which the user can interact with the media content; loading a test agent component onto a first of the user computers; loading a first scenario file comprising a series of user entry events that emulate user entry actions via a user interface device of the first user computer; executing the user entry events of the first scenario file by the test agent to generate system events that would normally be generated by a user operating the first user computer to interact with media server; and responding to the first user computer, by the server computer, to the system events.

Also, a vehicle entertainment test system is also provided, comprising: a server computer comprising media content; a plurality of user computers comprising software and hardware via which a user can interact with the media content; a network that interconnects the server computer and the plurality of user computers; a test agent that is loaded onto one or more of the plurality of user computers; a scenario file that is loaded onto a first user computer of the plurality of user computers comprising a series of user entry events that emulate user entry actions via a user interface device of the user computer; wherein: the user entry events of the scenario file are executed by the test agent to generate system events that would normally be generated by a user operating the first user computer to interact with media server; and the server computer responds to the system events provided by the first user computer.

DESCRIPTION OF THE DRAWINGS

The invention is described below according to an exemplary embodiment illustrated in the following Figures.

DETAILED DESCRIPTION

Figure 1:
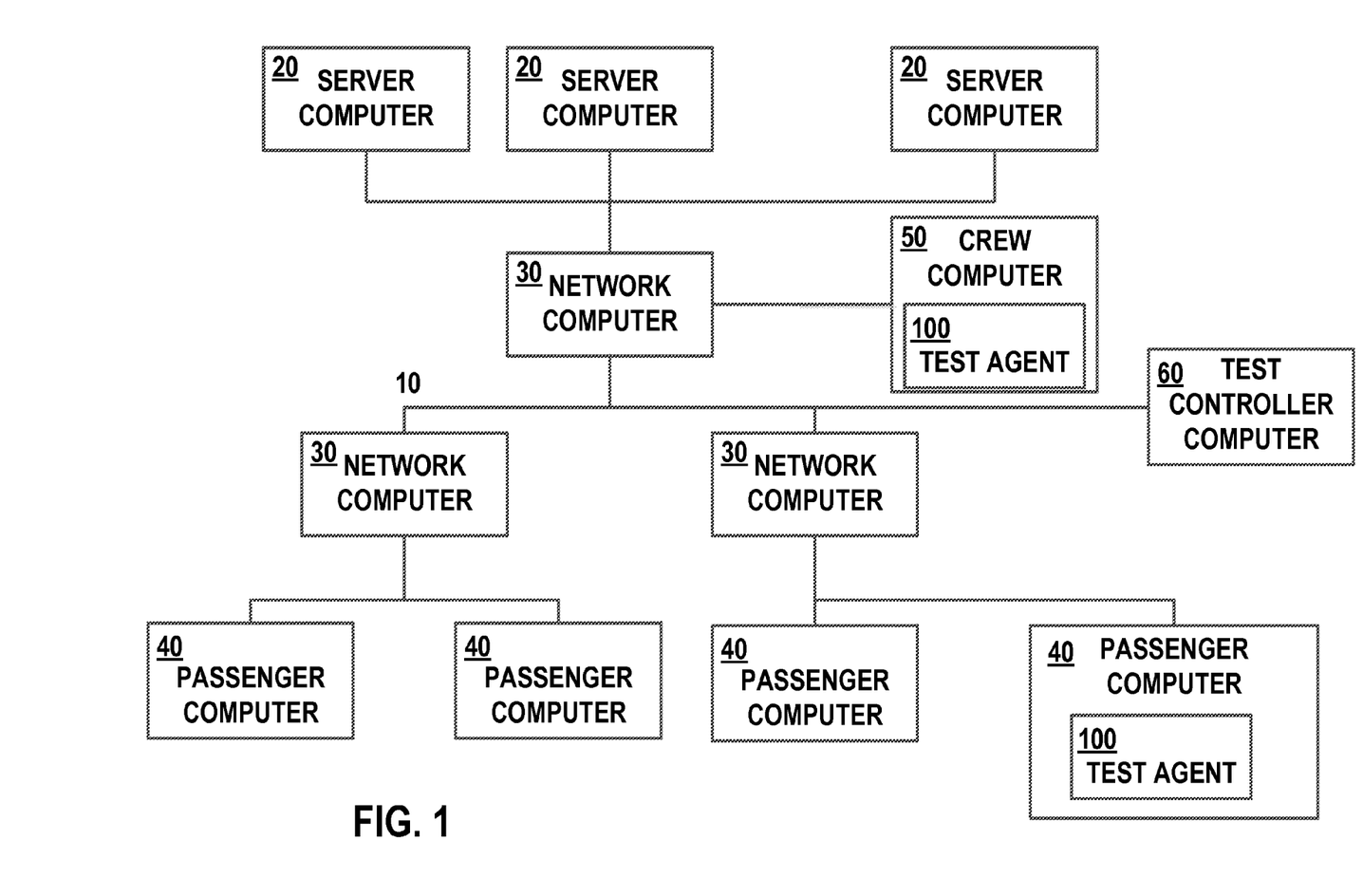
FIG. 1 is a block diagram of the primary system components.

FIG. 1 is a block diagram illustrating the architecture according to an embodiment of the invention, although it should be understood that there will almost always be many more computers in an actual IFES than are shown on this diagram. Further, the network connections between them may be more complex than shown here.

The Figure shows the basic components of an IFE system: it shows the personalized IFES comprising the communication network 10 interconnecting the computer systems that are dedicated to serving individual passengers (the passenger computers) 40, which provide media and other services to all passengers and crew members (server computers) 20, and which provide coordination and/or communication functions to allow all the systems to work together (network computers) 30. The server computers 20 hold media content. As used herein, the term "media content" is defined very broadly to include, in addition to traditional multimedia video and audio files, but also game data, and other informational services such as maps and airplane location data, etc.

A passenger interacts with and controls his or her personal use of an IFES using controls attached to the computer system(s) 40 which are dedicated him or her. Typically, the computer system(s) 40 dedicated to each passenger comprises a user interface that may include a video display unit (VDU) as well as a passenger control unit (PCU).

A crew member also interacts with and controls his or her personal use of an IFES using controls attached to the computer system(s) 50. Like the passenger computer system, typically, the crew member computer system(s) 50 comprises a user interface that may include a video display unit (VDU) as well as a user input device.

As used herein, for the purpose of simplification, the combination of user dedicated computer systems for a single user, either a passenger or a crew member, is referred to as a user interface system (UIS) 40, 50. Both a VDU and a PCU have a variety of control buttons and may provide an ability to perform controls through a touch-sensitive display. When a passenger uses one of these controls, the UIS 40, 50 recognizes the request and either provides the requested response or passes the request through the communication network to another one or more of the IFES computer systems.

When activated without action by passengers or crew members, an IFES generally does nothing after it has completed its initialization process—it simply waits for requests. Almost all possible IFES actions are responses to the use of a control (PCU button press or control operation, touch screen press, keyboard press) by a passenger or crew member. Thus, it is practical to test most functions of an IFES using only those controls, or, more accurately, using simulations of these controls.

According to an embodiment of the invention, special software, called a "test agent" 100 is provided to work with the UIS 40, 50 for the duration of the test. The test agent is designed to have minimal interaction with (and to run independently of) the standard software on those systems. In other words, for a most realistic test, the standard software remains in place and performs its usual functions. By minimizing interactions and keeping the test agent 100 very small, the chance that the test agent 100 will alter the behavior of the UIS 40, 50 is kept very low.

In a preferred embodiment, the components of the IFES are set up either in a lab or at a manufacturing facility, which is where they can be tested. However, nothing in this design precludes testing actual systems installed in aircraft during the service life of the aircraft.

Typically, normal operating software on the UIS 40, 50 is downloaded according to part numbers of a work order. In one scenario, a manufacturing or maintenance person downloads or updates software in the IFES by attaching an installation computer (not shown) to the computer network 10 and performing an installation procedure for the required part numbers. In alternate embodiments, however, the software can be updated automatically (i.e., without human intervention at the actual download stage of the process), and pushed remotely to the UIS 40, 50, or requested by the UIS 40, 50 itself. The test agent 100 can be downloaded similarly, i.e., as just another software component that can be run on the UIS 40, 50.

Figure 2:
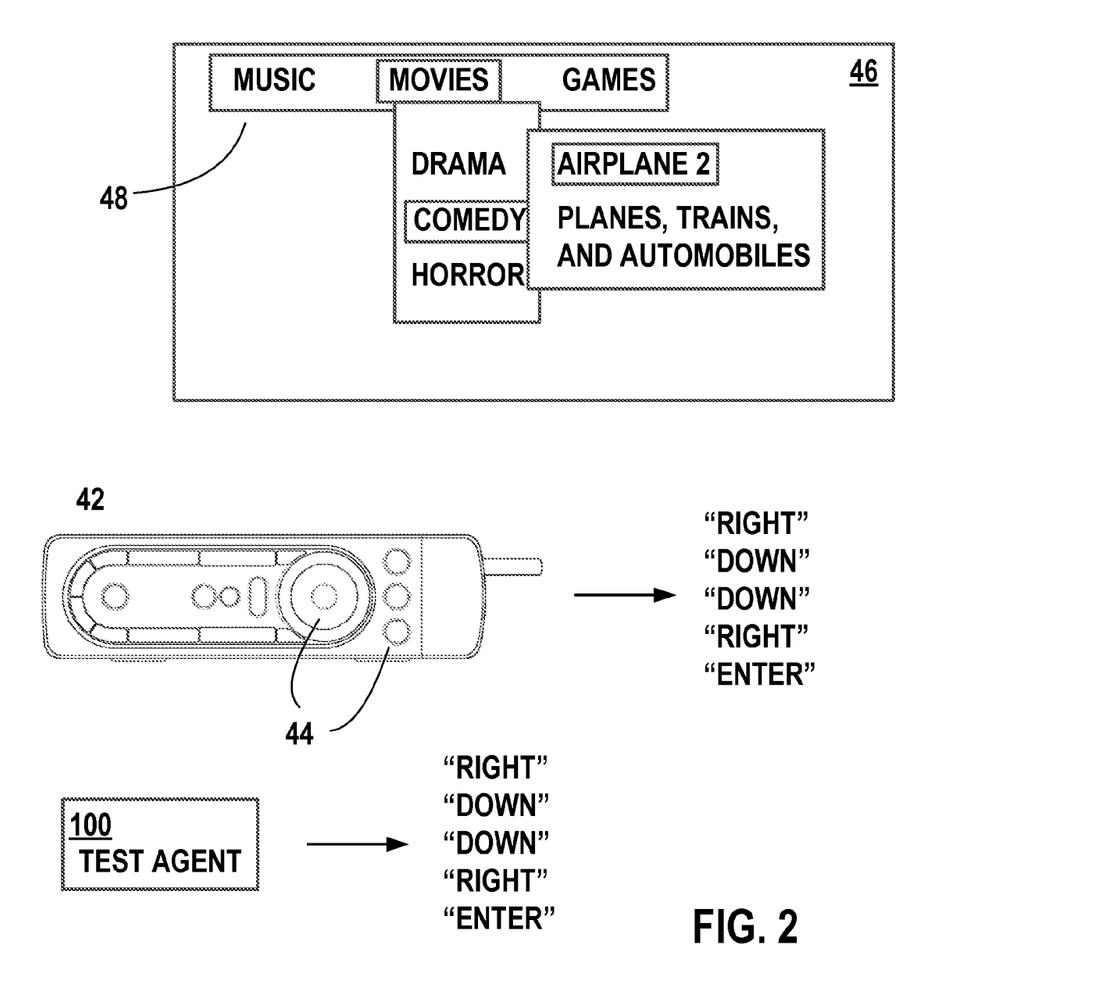
FIG. 2 is a pictorial diagram of a screen and PCU in the process of a movies selection.

Referring to FIG. 2, the test agent 100 has the ability to mimic receipt of a control action, such as might be generated by a PCU 42 by a user (passenger or crew member). In a normally operating system, when the user interacts with a control element 44 (or a touch screen), the standard system software on the UIS 40, 50 adds the event to a software queue of user requests. In the example shown in FIG. 2, when the user is presented with an entertainment home screen on the display device 46, he might use the PCU 42 to select a movie for viewing. He presses a right button to move a menu select cursor from "music" to "movies". He then presses the down button twice to select "comedy", and the right button to select the movie "Airplane 2". Once the desired movie is selected, the user may press "enter". Each of these key presses creates some form of event that can be dealt with either by the passenger computer 40 directly, or by some other entity in the system, such as the server computer 20, in which case the events can be sent across the network 10. The individual keypresses can be sent either in raw form (as individual keystroke events) or aggregated into some higher level form (e.g., a single "request movie 'Airplane 2'" event).

Figure 3:
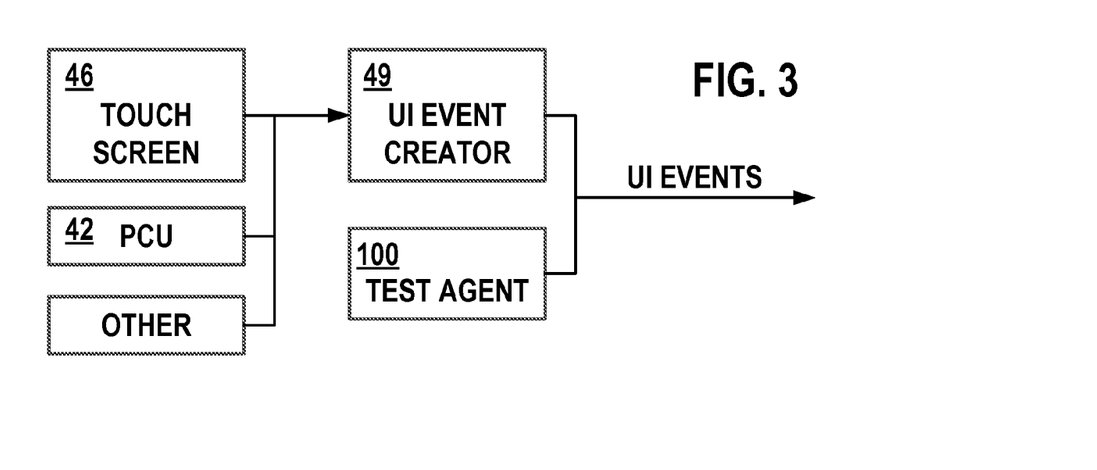
FIG. 3 is a block diagram illustrating the use of a test agent to replicate UI events.

As can be seen in FIG. 3, the test agent 100 can replicate any event that the hardware and driver-level UI event creator software 49 can generate. The test agent 100 is able to add events to the same queue as though a button 44 had been pressed or the touch screen 46 had been touched. The test agent 100 is able to do this without needing any physical contact with the actual controls by a real user, and it is able to do this in a way that cannot be distinguished by the remainder of the standard software as being in any way different from such physical contact. The result is that the standard software behaves exactly as it would if a user had used the actual physical control. Thus, the test agent 100 can be considered as, among other things, a user interface control emulator.

The test agent 100 is capable of emulating these user events by running a special program or a script that is downloaded to the UIS 40, 50 with the test agent containing a series of events to emulate. The collection of events that a given UIS 40, 50 might run is called a "scenario", and the collection of events making up a scenario could be stored in a scenario file. For the simplistic example illustrated in FIG. 2, the scenario file would comprise five keystroke events. The scenario file itself is preferably formatted in text or XML for ease of editing, although the underling format of the file is not important, and could be in any form. The scenario files can be readily combined and edited to accommodate any desired test. Note that any user interaction on the UIS 40, 50 can be emulated, including service activities, such as turning on a reading light, pressing an attendant call button, etc. The following table illustrates an exemplary scenario file in which the pages for starting a movie on the user interface are accessed:

TABLE 1

```
svdu_type=3
id=1,type=1,code=68,value=1,tv_sec=1,tv_usec=0
id=2,plugin=ccheckplugin.sh,ID=1000,DBR=100000,NR=10,context=
SIMLAB_BROWSE_RIGHT-1
id=3,type=1,code=68,value=1,tv_sec=0,tv_usec=0
id=4,plugin=ccheckplugin.sh,ID=1000,DBR=100000,NR=10,context=
SIMLAB_BROWSE_RIGHT-3
id=5,type=1,code=65,value=1,tv_sec=0,tv_usec=0
id=6,plugin=ccheckplugin.sh,ID=1000,DBR=100000,NR=10,context=
SIMLAB_BROWSE_RIGHT-4
id=7,type=1,code=65,value=1,tv_sec=0,tv_usec=0
id=8,plugin=ccheckplugin.sh,ID=1000,DBR=100000,NR=10,context=
SIMLAB_BROWSE_RIGHT-5
id=9,type=1,code=65,value=1,tv_sec=0,tv_usec=84862
id=10,plugin=ccheckplugin.sh,ID=1000,DBR=100000,NR=10,context=
SIMLAB_BROWSE_RIGHT-6
id=11,type=1,code=65,value=1,tv_sec=0,tv_usec=0
```

In this example, id is the event identifier, type is a type of action (here "1" means a key stroke), code, for this action, is a keystroke code (e.g., up arrow, letter, etc.), tv_sec and tv_usec are delays that are introduced after the event (sec and usec representing seconds and microseconds), the plugin in this instance is a plug-in program that ensures the system performed as expected (e.g., displayed the right screen in response to the keyboard press action), DBR represents a delay before retry, NR represents the number of retries, and context provides an expected value to receive from the plugin to determine if the system is in the proper context.

Although the above describes the events in terms of low-level user interface interactions, it is also possible to have higher-level events. For example, one could define a single high level, "request movie 'Airplane 2'" event that would replace the series of five keystrokes. In this design, extensive use of programming concepts could be included, such as the use of variables, "request movie % x" where % x is a variable provided the a caller. Furthermore, conditional statements could be included in the scenario files for events or for higher level constructs, and these conditional statements could take into account various state variables available (e.g., "the display is currently on the home screen" or "the user is playing the movie 'Airplane 2'").

Additionally, it may also be possible to create the scripts in a much more visual form than simply typing in a text or XML file. For example, a series of icons or pictures could be used in a pictorial scenario creation tool via which a developer could create specific scenarios by dragging and dropping commands, data items, etc., into a sequence chain.

Also, event files could be created by using an "event recorder". A user on a UIS 40, 50 (or other computer) could turn on the event recorder and record the user interface interactions (such as keypresses) needed to perform a certain action. These recorded interactions could then be stored in an event file (or scenario file) and replayed. This could function similar to recording a macro in a word processor.

Figure 4:
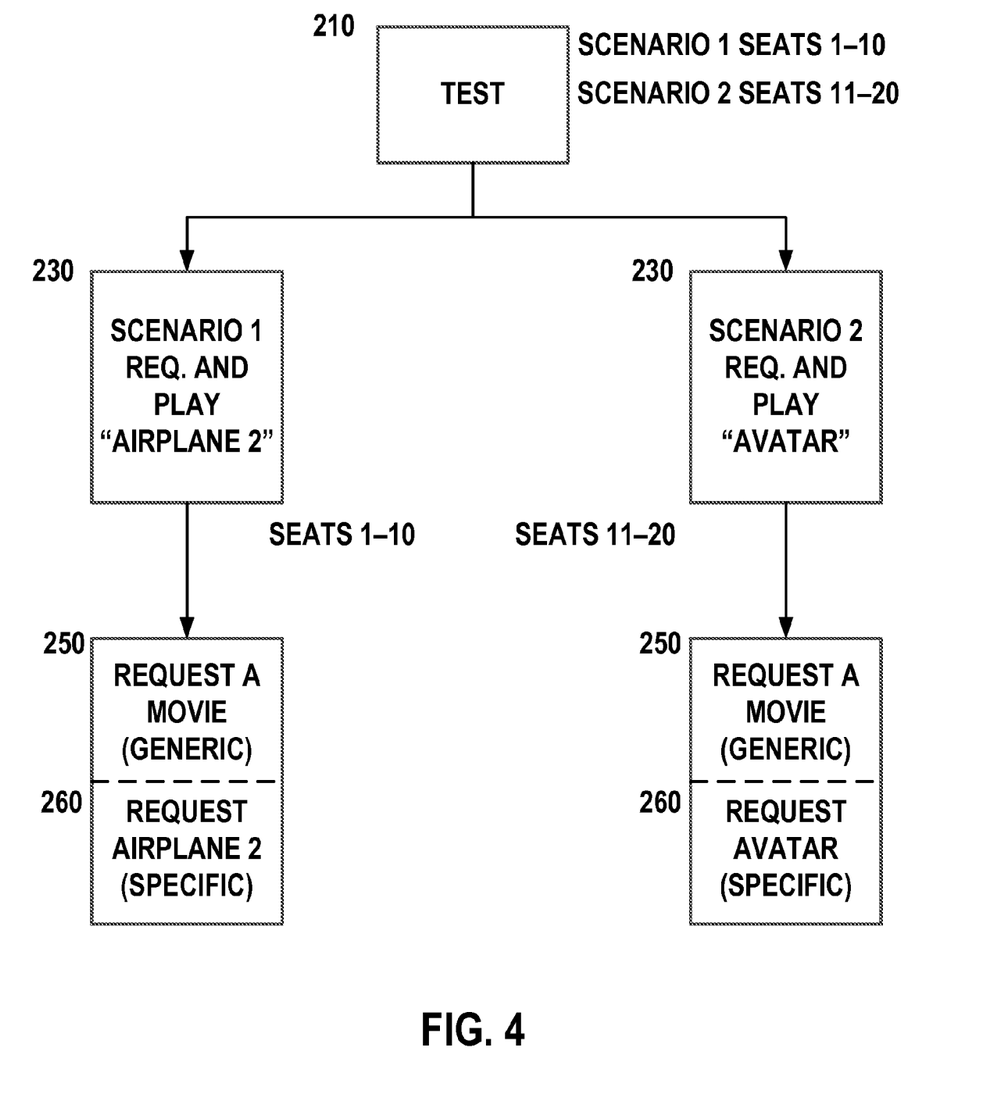
FIG. 4 is a hierarchical block diagram illustrating the components of a test.

The timing of user requests is important to performing a valid test. Requests must occur at intervals similar to the intervals between requests from an actual user, or at intervals which are possible for a human user to achieve. It would not constitute a valid test of the IFES to simulate user actions at intervals faster than would be possible for an actual user. Thus the test agent added to a UIS 30, 40 may include several mechanisms to control the timing of the simulated events it adds to the software queue. Each event described in the scenario file can also include a delay. Such a delay could either be a pre- or post-event execution delay. In the Example illustrated in FIG. 2, it may be determined that, on average, a user takes one second between menu selections. Thus, each button press could include a one-second delay afterwards. In a test in which a movie is requested, a delay of two hours might be added before the next command is to be executed to allow the movie to stream to the UIS 40. Or, for example, the test agent 100 scenario might have a command to pause the movie one hour into it. Wait 5 min., and then un-paused As illustrated in FIG. 4, the overarching construct is the test 210. A test is an overall test of the IFES, and comprises all of the scenarios required to implement a particular test. Since a scenario 230 is a sequence of events to be executed by the test agent 100 on any given UIS 40, 50, different scenarios can be run on different UISs 40, 50. By way of example, in FIG. 4, a test 210 is designed to have a first scenario (Scenario 1) 230 which emulates a user requesting and playing the movie "Airplane 2". A second scenario (Scenario 2) 230 emulates a user requesting and playing the movie "Avatar". The test defines that the UISs 40 representing seats 1-10 should execute the Scenario 1 file, and that the UISs 40 representing seats 11-20 should execute the Scenario 2 file. In a real-world test, there would be many additional scenario files and seats to include.

As can also be seen in FIG. 4, scenarios 230 can be broken down into generic components 250, such as "request a movie", and specific components 260, such as, "the movie to request is Airplane 2". This permits a one-time creation of a generic component for a specific action, and then the addition of the specific component with minimal effort. By way of example, the generic movie request sequence could be entered with the recorder just once, and then only the specific commands for selecting the specific movie would need to entered subsequently, either via a recorder or, e.g., text editor.

In the same way that events can have delays specified/associated with them, scenarios can similarly have specified delays. For example, the test could specify that Scenario 2 is to start on seats 11-20 one minute after Scenario 1 starts on seats 1-10. This permits a use ramp up of the IFES to be simulated by the test.

The primary timing, synchronization, and control of the test is governed by the test controller computer 60, which is connected to the IFE network, and which serves as a graphical user interface (GUI) for the tester. The initiation of execution of the scenarios on each UIS 40, 50 by the test agent 100 (once they have been loaded onto the UIS 40, 50) can be initiated by a command from the controller computer 60, which serves as the host for testing. This computer 60 is connected during the test and throughout the integration of the system, and is preferably a computer that sits in the lab. For each lab built for aircraft customers, the test controller computer 60 is added to the system for testing purposes. This computer is used to check how a particular device is behaving, and it may access the UISs 40, 50 remotely. Using the test controller 60 the tester can act on all of the agents 100 that are distributed on the IFE system.

The test agents 100 can be present on an actual airplane IFE system. Although it is preferable that the test controller computer be located near the devices running the test agent, it is also possible that the test controller computer be located remotely and possibly off-site. This would permit certain diagnostics to be performed by technicians who are located at some distance from the actual IFE system being tested. This could be hundreds or thousands of miles away.

In an example, the test controller computer 60 sends a command to the UIS that says, "start running your scenario", and the UIS begins execution.

The test controller computer 60 does not need to be (nor should be, with some exceptions) involved with the execution of the scenario in order to provide as realistic of a test as possible, without introducing any computations or network traffic load on the UISs 40, 50. However, the test controller computer 60 can be used to halt execution of a scenario on one or more seats. Also, the test controller 60 can be used to implement the scenario delay, or alternately, the scenario delay could be a part of the scenario file. In the former case, the test controller 60 would simply not send the "start scenario" command to the Scenario 2 UISs for, e.g., one minute after it sent out the "start scenario" command to the Scenario 1 UISs. In the latter case, Scenario 2 has a command built into it that says, "wait one minute before starting"—in the latter scenario, the test controller 60 could send out the "start scenario" command simultaneously.

One of the commands the test controller 60 may send to a test agent 100 tells the agent the name and location of a test control (scenario) file which the agent 100 should use the next time it receives a command to begin a simulation. When a test agent 100 receives this information, it obtains the specified file and loads it into the agent's memory. As described above, when the test agent 100 receives a command to begin a test, it adds an event representing each action in the control file to the system software's event queue, waiting the specified intervals between each event.

A scenario file 230 may contain instructions/events other than simple user actions. As noted above, a further timing mechanism is an instruction to pause processing of the scenario file 230 until a specific condition becomes true. One typical condition that can be tested is the response of the IFES to a previous user action. Not all possible user actions have instantaneous results. Some may cause activities on one or more of the other computer systems in the IFES and those activities may take variable lengths of time to complete. For example, a user action may cause the display screen to change on the UIS 40, 50, providing the user with a new set of command options from which to select. The meaning/interpretation of using one of the UIS controls may be different before and after this screen change occurs. In other words, the UIS controls can be context dependent. Therefore, the test agent 100 needs to know that it should delay further processing of the scenario file 230 until the IFES completes responding to the previously specified actions.

As suggested above, the test control file/scenario file 230 may also specify conditional actions. That is, it may specify that a specific action or set of actions should only be simulated if a particular condition is true (or not true), and may implement Boolean logic options for more complex conditions. In this way, the test can adapt to alternative responses by the IFES to previously simulated actions. For example, an attempt to choose a restricted entertainment program may be rejected by the IFES if it believes the passenger making the request should not be authorized to receive that program. A complete test sequence should ideally anticipate all possible responses. For example, if a user needs to press ten buttons to go to a particular movie page, movie selection page, from the welcome page, the system could simulate a user pressing the first button, then waiting ten seconds, then pressing the second button, or, the test agent 100 could be instructed to press the button to go to the next page, and then as soon as the next page is displayed (i.e., the test agent 100 detects the state change), press the next button. Thus, the testing can be either delay driven or context driven.

Also, as an example of conditional statements that can be used in the scenario, if a user stops a movie in its middle, when trying to restart the movie, the passenger computer may ask whether the user wants to start from where the movie left off or start from the beginning. This is an example of a situation that managed through a conditional test. The user could start the movie and, if no video stream is seen, the system can determine if the user is in the checkpoint mode of the system, and a decision can be made as to whether to reset to start from the or to resume from where the user stopped. If the user is not in the checkpoint mode, that means that there is a problem and an error will be raised.

The condition tested may also be the result of a simple software function that produces a pseudorandom result. That is, the truth or falsehood of the condition tested may be random. A recording of conditions using the randomized functions can store the randomized functions generated that, e.g., produce an error condition, and therefore the recorded files can permit repeating of a test using this capability so that it can be repeated. Test sequences using randomness more closely resemble actual flight experience and provide a useful check on other results.

The scenario file 230 may specify that a sequence of test instructions, possibly including user actions, conditional tests, and other sequences of instructions, may be repeated, either a specific number of times, indefinitely, or until a conditional test is satisfied. An indefinitely repeating sequence is continued until a test operator terminates the test using the test controller computer 60. Any normal program tools, such as branching, looping, conditional testing, etc. can be implemented in the scenario file 230.

The entire process of using this system to conduct a test of an IFES includes actions performed by a test operator using the test controller computer 60. The system includes software intended to run on a particular computer to facilitate the test. Such software is referred to as a Test Control Program (TCP). The TCP displays information about a test to the operator, accepts commands to control the test from the operator, sends commands to each of the test agents 100 running on the multiple UISs 40, 50, and accepts status information from those test agents 100. It also may create and make available to the test agents 100 the test control/scenario 230 files.

Using an illustrative example, when a test operator desires to conduct a test, he starts the TCP on the test controller computer 100. The TCP presents him information about the test capabilities of the IFES, including any previous tests performed. It then allows him to define a new test 210 or choose to repeat one of the previous tests 210. When the operator has completed specifying the test 210, he commands the TCP to start it. The TCP then sends the name and location of the appropriate test control/scenario 230 file to each participating test agent 100. The participating test agents 100 can be identified in a file, or manually specified by the operator. The operator can, via the TCP, also query each of the UISs 40, 50 to determine if they are capable of participating, and can select from the UISs 40, 50 positively responding to such a query. After all agents 100 have received their control files and are ready to begin, the TCP sends a test start command to all agents simultaneously using a broadcast message, with the test agents in a mode to listen for such a broadcast message. In this way, the activities of all the agents 100 can begin at the same time so that there is a known time relationship between the planned activities of all agents. At this point, the agent 100 may operate completely independently of test controller 60. However, in an embodiment, the test controller 60 can also send a command to the test agent 100 that can put the agent 100 in a state where it is listening for another start test command, or send other operating instructions to the test agent 100.

There are various ways that can be used to include and exclude various UISs 40, 50 from the test. For example, if a given UIS 40, 50 is not to run a particular test, it can simply not have a scenario downloaded to it. When this UIS receives a start command and has no scenario to run, it simply ignores the start command and does nothing. Alternately, the test controller 60, instead of issuing a broadcast start message, it can direct the messages to individual UISs 40, 50.

The test controller 60 can also send a "delete scenario" message to one or more of the UISs 40, 50.

Logging of results can take place on the UIS 40, 50 by storing the results in a file accessible by the TCP, or they can be sent to the TCP on the test controller 60, where result files can be kept in a centralized location. It is highly desirable to no introduce additional network traffic during a test in order to produce as realistic of results as possible. Therefore, in a preferred embodiment, any logging data is kept at the UIS 40, 50 until the entire test is complete, at which point in time it may be moved to a centralized location, such as the test controller 60, or sent on to a further computer for analysis and display (graphs, etc.). A user can define what information should be logged during the test—this may be a level-based logging (e.g., critical, error, warning, normal, success), or criterion-based. The logging can take place independently of the test, and can execute as collector executable files, that collect specified parameters (time, operating conditions, etc). Collection of the log data can be done via a user interface of the test controller 60.

The test controller 60 can determine that the test is complete (i.e., all UISs 45, 50 have run their scenarios) by either having an ending event in the scenario file that sends an "end" (scenario completion) message to the test controller 60, or it could make a calculation based on information contained within the scenario files (but this might not be accurate if random timing or events are used). It is also possible that the test agents 100 send event completion events to the test controller 60 upon completion of each event, although this approach has the disadvantage that additional traffic is introduced on the network 10 while testing is going on.

Ideally, this system is implemented in conjunction with a complete set of IFES equipment comprising all the computers and network connections which would be installed on an actual aircraft. The IFES equipment set should be connected to suitable power and arranged in a reasonably compact way to allow a test engineer convenient access to all components. Each UIS computer should be positioned such that the test engineer can view all or most of the displays concurrently, although clearly when this system is used in an actual aircraft, this would not be possible (or might at least employ numerous viewers). Then the test control computer 60 is preferably connected to the IFES network in such a way that it is able to communicate through the network 10 with all of the computers which comprise the IFES. It is also possible to perform such a test with the IFES equipment installed in an aircraft, although this somewhat limits the ability of the operator to view all of the UISs 40, 50 simultaneously. In this scenario, however, UIS devices 40, 50 running a test resulting in problems could easily be manually inspected, particularly if a location of each UIS is identified in a database for the test controller computer 60.

Given this arrangement, a test engineer can use the TCP running on the test control computer 60 to configure and start a test, use the TCP to monitor the test while it progresses, and use the TCP to end the test when desired or to insure the test ends as planned. While the test proceeds, the test engineer can collect log files and other measurement data representing the result of the test so that both test successes and failures may be analyzed in detail. The analysis of log files can be done manually or also could utilize an automated procedure so that voluminous data can be considered efficiently.

Alternatively, this system may be used in conjunction with a partial set of IFES equipment and network connections representing a fraction of the equipment which would be installed on an actual aircraft. When operated in this way, the system could be used to isolate observed failures or to confirm correction of such failures. Complete performance analysis of an IFES in this configuration would not be possible but the lower cost and complexity of such a limited test environment might allow more rapid progress toward test solutions.

It may also be possible to augment a partial set of IFES equipment as described above with a further system to simulate the remainder of a complete set of equipment. A unique test agent for such a simulation system may be installed to allow the simulator to respond to the TCP as though it were actual IFES equipment. When operated in this way, this system can perform tests of a complete IFES installation without the cost or complexity of a complete installation.

The functionality of the test agent 100 can also be expanded by downloading additional associated applications that can interact with the test agent 100. The log file routines could be implemented in this manner, i.e., not as a part of the test agent 100 itself; but as a functional add-on program. By way of example for a further add-on, if one wanted to know the operating temperature at a particular passenger computer, the test agent could download a routine capable of accessing current temperature information from the passenger computer. This information could then be made a part of the log data provided (e.g., "when this module failed, the temperature was 115° F. in the passenger computer 40 housing" or "go into an emergency shutdown if the temperature exceeds 125°").

The test agent 100 may also be used to update itself with the latest version(s) of the software. The test agent 100 can also do things that a passenger can not do, for example, it can simulate a system failure, or a failure on a particular system. Additional programs associated or downloaded by the test agent 100 could also be used to put some form of stress on the device or network being a part of the test. The failure of the LRU can be simulated as well, or the entire box itself could be dropped out of the system. Thus, the agent 100 can be thought of as a scheduler in one sense, i.e., a scheduler of actions that can be performed on a particular LRU. This action can come from a passenger action or any other type of useful action. The agent is like a small robot that is within the LRU. That can be remotely controlled for scenarios that are defined.

Figure 5:
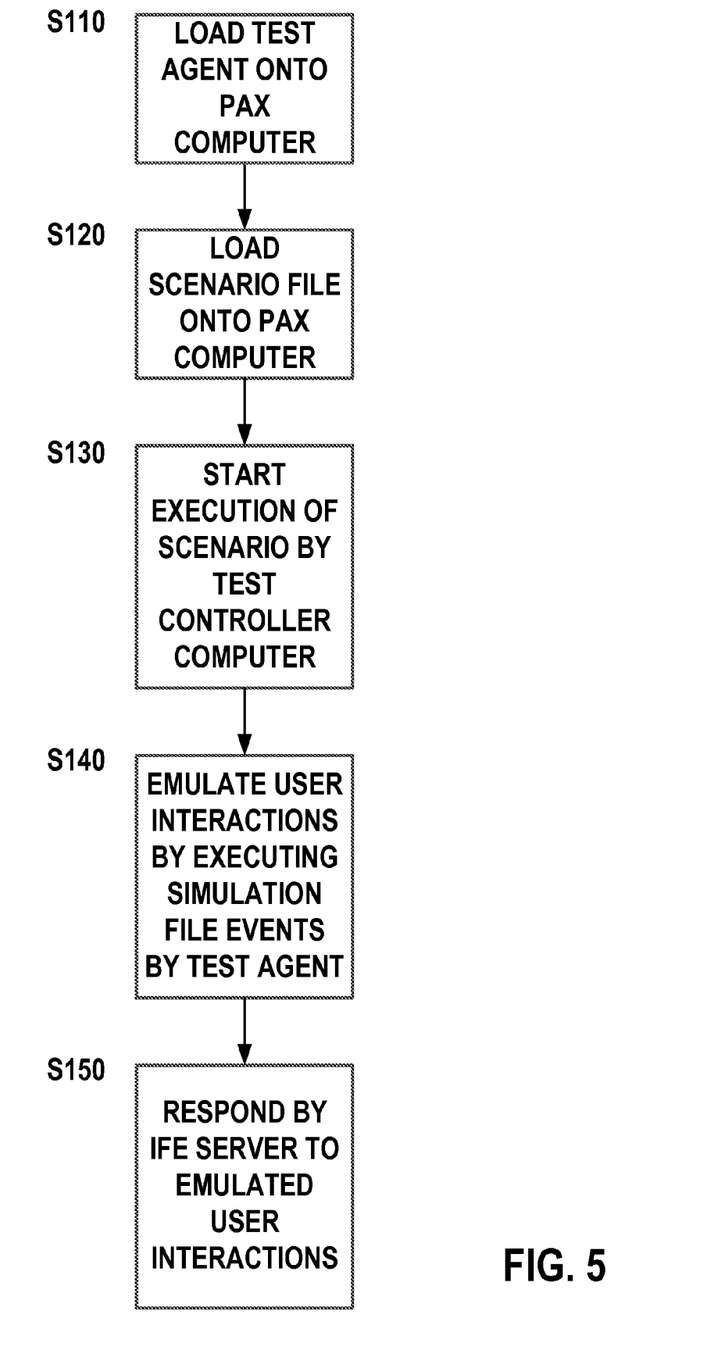
FIG. 5 is a flowchart illustrating a basic series of steps, according to an embodiment.

FIG. 5 illustrates a series of basic steps that are performed in the system. To summarize the process, in S110, the test agent 100 is loaded onto the passenger (or crew) computer 40, 50. In S120, the scenario file 230 containing events to emulate are also loaded into the passenger or crew computer 40, 50. In S130, the test controller computer 60 initiates the scenario 230 on the test agent 100, which, in S140, emulates the user interactions, including those to the IFE server computers 20. In S150, the IFE server computers 20 respond to generated requests as if a user were operating the computer 40, 50. In this way, a thorough testing of the IFE system can be achieved in a reliable and consistent manner without the costs of having actual people perform the actions.

Although this system has been described as being loaded onto a UIS 40, 50, i.e., either a passenger or crew computer, there is nothing that precludes the test agent 100 and associated scenario 230 from being loaded into a server computer 20 or a network computer 30.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

| TABLE OF REFERENCE CHARACTERS | |
|---|---|
| 10 | communication network |
| 20 | server computer |
| 30 | network computer |
| 40 | passenger computer |
| 42 | personal control unit (PCU) |
| 44 | controls |
| 46 | display |
| 48 | menu |
| 49 | UI event creator |
| 50 | crew computer |
| 60 | test controller computer (test computer graphical user interface (GUI)) |
| 100 | test agent |
| 210 | test, test file |
| 230 | scenario files, test control files |
| 250 | generic portion of scenario files |
| 260 | specific portion of scenario files |

What is claimed is:

1. A method for testing components of a vehicle entertainment system, comprising:

interconnecting, via a network, a server computer comprising media content, and a plurality of user computers comprising software and hardware, wherein a user can operate a first one of the user computers to interact with the server computer to select among the media content for download to the first user computer;

loading a test agent component onto the first user computer;

loading a first scenario file comprising a series of user entry events that emulate user entry actions via a user interface device of the first user computer, wherein the user entry events in the first scenario file have one or more event execution delay values associated with them; and executing the user entry events of the first scenario file by the test agent to generate system events that would normally be generated by a user operating the first user computer to interact with the server computer to select among the media content for download to the first user computer,
wherein following execution of one of the user entry events in the series of the first scenario file, delaying by the test agent the execution of a next one of the user entry events in the series of the first scenario file for a length of time determined based on the event execution delay value associated with the next one of the user entry events.

2. The method according to claim 1, further comprising:
connecting a test controller to the network;
assigning, by the test controller, the first scenario file to the first user computer;
assigning, by the test controller, a second scenario file to the second user computer wherein the second scenario file comprises a series of user entry events that emulate user entry actions via a user interface device of the second user computer;
sending a start execution command from the test controller to the first and second user computers to initiate the execution of the first and second scenario files, respectively.

3. The method according to claim 1, further comprising:
logging data associated with execution of the first scenario file on a data store of the first user computer until execution of the first scenario file is essentially complete.

4. The method according to claim 1, wherein the first user computer is a passenger computer or a crew computer.

5. The method according to claim 1, wherein the series of user entry events emulates user entry actions from one or more of movement key presses, button presses, alpha-numeric key presses, touch pad movements, roller ball movements, joystick movements, and screen selections.

6. The method according to claim 1, further comprising:
following execution of another one of the user entry events in the series of the first scenario file, delaying by the test agent the execution of a next one of the user entry events in the series of the first scenario file until a defined response is received by the first user computer from the server computer.

7. The method according to claim 1, wherein the first scenario file is a text file or an XML file.

8. The method according to claim 1, wherein the first scenario file contains events for requesting and playing a specific movie or audio file by the first user computer.

9. The method according to claim 1, wherein the first scenario file contains events for operating a reading light or operating an attendant call button by the first user computer.

10. The method according to claim 1, further comprising:
expanding functionality of the test agent component by downloading one or more modules to the first user computer that are accessible and used by the test agent component.

11. The method according to claim 1, further comprising:
executing conditional or looping operations for the series of user entry events of the first scenario file.

12. The method according to claim 1, further comprising:
generating at least a portion of the first scenario file by a recording algorithm that records manual user entry events occurring on a user computer.

13. A non-transitory computer readable medium comprising instructions that are executable by a processor to perform the method as claimed in claim 1.

14. The method according to claim 1, further comprising:
generating at least a portion of the series of user entry events of the first scenario file by repeatedly selecting among known ones of the user entry events based on a randomized function.

15. The method according to claim 2, wherein the sending of the start execution command is performed by broadcasting a single message over the network.

16. The method according to claim 2, wherein the first and second scenario files have a generic portion having a common set of operations between each other, and a specific portion that has unique operations between each other.

17. The method according to claim 10, wherein the one or more modules that is downloaded comprises a log file module that logs status and error messages associated with the first user computer while executing the first scenario file.

18. The method according to claim 10, wherein the one or more modules that is downloaded comprises a status or state module that accesses status or state information while executing the first scenario file.

19. A vehicle entertainment test system, comprising:
a plurality of user computers comprising software and hardware, wherein a user can operate a first one of the user computers to interact with a server computer via network to select among media content on the server computer for download to the first user computer;
a test agent that is loaded onto the first user computer; and
a first scenario file that is loaded onto the first user computer, the first scenario file comprising a series of user entry events that emulate user entry actions via a user interface device of the first user computer, wherein the user entry events in the first scenario file have one or more event execution delay values associated with them;
wherein the user entry events of the first scenario file are executed by the test agent to generate system events that would normally be generated by a user operating the first user computer to interact with the server computer to select among the media content for download to the first user computer, and
wherein following execution of one of the user entry events in the series of the first scenario file, the test agent delays the execution of a next one of the user entry events in the series of the first scenario file for a length of time determined based on the event execution delay value associated with the next one of the user entry events.

* * * * *